Nov. 16, 1948.                    H. J. HEPP                    2,454,171
COMBINATION ISOMERIZATION AND HYDROGENATION PROCESS
Filed Jan. 21, 1946
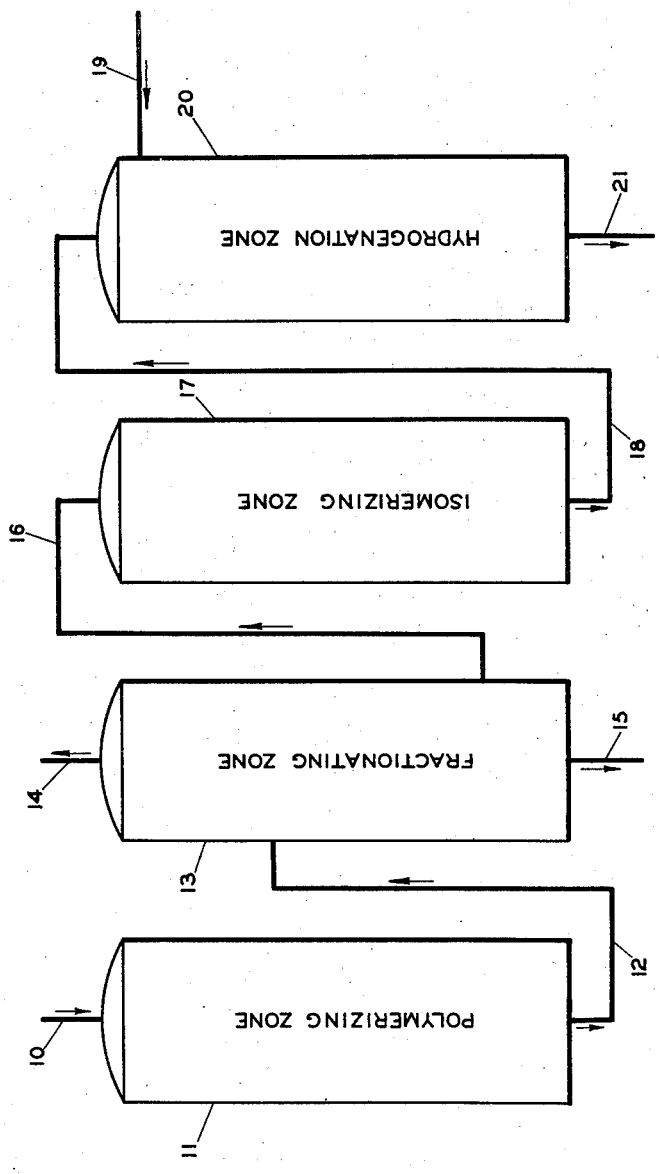
INVENTOR.
H. J. HEPP
BY Hudson and Young
ATTORNEYS Patented Nov. 16, 1948

2,454,171

UNITED STATES PATENT OFFICE 2,454,171

COMBINATION ISOMERIZATION AND HYDROGENATION PROCESS

Harold J. Hepp, Bartlesville, Okla., assignor to Phillips Petroleum Company, a corporation of Delaware Application January 21, 1946, Serial No. 642,449

4 Claims. (Cl. 260—683.6)

1

This invention relates to methods for the synthesis of paraffin hydrocarbons by hydrogenating olefins. In one particular aspect it relates to methods for pretreating the olefin feed and isomerizing olefins contained therein; and in another particular aspect it relates to methods for preventing losses due to decomposition during the hydrogenation process.

The production of motor fuels of high antiknock value is often accomplished by polymerizing light olefins, such as butenes, to form hydrocarbons boiling in the gasoline range, such as octenes, and hydrogenating these polymers to the corresponding paraffins. A high octane motor fuel is obtained, for example, by polymerizing isobutylene to form 2,2,4-trimethylpentene and subsequently hydrogenating this polymer to the corresponding saturated compound, 2,2,4-trimethylpentane.

First steps in such processes are often conducted as selective polymerization operations. It is well known that the tertiary olefins are more reactive in the usual polymerization reactions than their isomers. Thus, for example, a $C_4$ hydrocarbon stream may contain isobutane, normal butane, isobutylene and 1- and 2-butenes. It is possible to treat a stream of such composition under very mild conventional polymerizing conditions so that selective polymerization of isobutylene is obtained. The resulting diisobutylene polymer may then be easily separated from the $C_4$ mixture and hydrogenated to yield a high octane motor fuel. Subjecting a similar $C_4$ hydrocarbon stream to polymeriaztion under more severe conditions results in the formation of a $C_8$ fraction containing substantial amounts of polymerized normal butenes and upon hydrogenation this is converted into a motor fuel of lower octane number than that of the hydrogenated polymer from the selectively polymerized isobutylene.

However the polymers produced by the selective polymeriaztion of isobutylene or other tertiary olefins are characterized by high losses during hydrogenation unless very active catalysts, low temperatures and high hydrogen pressures are used. These losses are caused by the formation of decomposition products. For example, 100 barrels of the selective polymer may, upon hydrogenation, yield only 70 barrels of hydrogenated polymer. On the other hand the polymers obtained by non-selective polymerization may be hydrogenated under the same conditions with less than 2 per cent loss by decomposition.

It is obvious that a process whereby such selectively obtained polymers could be hydrogenated

2 with greatly reduced decomposition losses is greatly to be desired.

It is an object of this invention to provide a process whereby the hydrogenation of olefins may be accomplished with increased yields of the hydrogenated product.

Another object of this invention is to provide a process for decreasing losses due to decomposition of 1-olefins in hydrogenation processes.

A more specific object is to provide a method for preparing 2,2,4-trimethylpentane in increased yield from 2,2,4-trimethylpentene.

Other objects and advantages will become apparent as this disclosure proceeds.

I have discovered that substantial reduction of losses caused by decomposition during hydrogenation of selectively obtained polymers of isobutylene or of 1-olefins may be effected by isomerizing the selectively obtained polymer or 1-olefin to an isomer in which the double bond is shifted to a non-terminal position to form a 2-olefin prior to hydrogenation. The 2-olefin is much less subject to cracking losses during hydrogenation than the corresponding 1-olefin.

The following equation illustrates the reaction of selective polymerization of iso-olefins using isobutylene as an illustrative example:

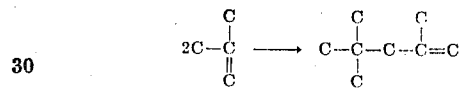

The 1-olefin polymer formed undergoes isomerization whereby the unsaturated linkage migrates to a non-terminal position.

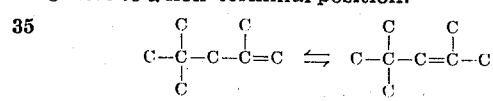

The reaction is of the equilibrium type. That is, a 1-olefin is gradually converted into an olefin having a non-terminal double bond until concentrations of the components reach equilibrium values.

Equilibrium values vary considerably with the temperature of the system, low temperatures decreasing the proportion of 1-olefin in the equilibrium mixture and high temperatures increasing it.

Equilibrium conditions are usually very slowly reached in the absence of catalysts but the reaction rate may be greatly increased by the presence of well known catalysts.

This equilibrium is characteristic of 1-olefins and is not limited to those obtained by polymerizing lighter olefins. This invention is applicable to many 1-olefins in processes where it is desired to hydrogenate the same to form the corresponding paraffins.

The accompanying drawing is a schematic diagram of one specific embodiment of this invention. Line 10 conducts the feed, which in this specific embodiment of the invention consists of a mixture of isobutylene, normal butenes, isobutane and normal butane, to polymerization zone 11.

In this zone the isobutylene is selectively polymerized. This polymerization is conducted under conditions sufficiently mild to prevent polymerization of the normal butenes to any great extent but at the same time severe enough to effect substantial polymerization of the isobutylene. Catalysts useful in this step are silica-alumina, phosphoric acid on kieselguhr, supported copper pyrophosphate, hot or cold sulphuric acid, and others known to catalyze the reaction. The catalysts enumerated are preferred as most effective. The conditions in the polymerization zone are adjusted in accordance with the catalyst used by using principles well known in the art.

The effluent from the polymerization zone is conducted via line 12 to fractionating zone 13 where the mixture is separated into a $C_4$ and lighter fraction which is removed via line 14 to suitable utilization, not shown, a high polymer fraction such as $C_{12}$ and higher which is removed via line 15 to utilization not shown, and intermediate gasoline range polymers containing a substantial proportion of diisobutylene. The intermediate polymers are conducted via line 16 to the isomerization zone 17.

The relatively unstable 1-olefins are isomerized to more stable 2-olefins in zone 17, as previously described. At comparatively low temperatures the 1-olefins present are almost completely converted to 2-olefins. Bauxite, activated alumina, aluminum sulphate and numerous other catalysts may be used for this isomerization but I prefer to use brucite as disclosed in U. S. Patent 2,361,613. This naturally occurring mineral, because of its high content of relatively pure magnesia, superior adsorbent qualities and exceedingly large active surface is a very suitable catalyst for low temperature isomerization. It is activated by heating at a temperature above 700° F. to drive off water vapor and is scrubbed with an inert gas until substantially free from oxygen, carbon dioxide and acidic gases. So prepared this catalyst may be used with hydrocarbons either in liquid or vapor phase, at temperatures from 50° to 450° F. and with flow rates of from 0.5 to 5.0 liquid volumes per volume of catalyst per hour, the pressure being adjusted to maintain the phase in which operation is desired. With other catalysts conditions conducive to efficient operation with those catalysts should be chosen.

The isomerized polymer is removed from isomerization zone 17 via line 18 and is conducted to hydrogenation zone 20. Hydrogen is introduced into this zone via line 19. Numerous hydrogenation catalysts are known and may be used in this hydrogenation step if conditions known to be effective with the particular catalyst employed are maintained. I prefer to use the nickel-copper-alumina catalyst of U. S. Patent 2,242,627. This catalyst is prepared by repeatedly soaking a granular support, such as pumice, in a solution of nitrates of nickel, copper and aluminum, followed by drying and heating to convert the nitrates to the corresponding oxides and reducing in a stream of hydrogen. The catalyst contains metallic copper and nickel and aluminum oxide, with an aluminum nickel ratio of about 1:3.8 and copper between 10 and 50 per cent of the total metals present. The conditions of operation using this catalyst are from 200° F. to 700° F. at a pressure of 750–1000 p. s. i. g. Sufficient hydrogen is added to the zone to cause the hydrogenated effluent to contain at least 10 mol per cent of hydrogen; this hydrogen representing the excess hydrogen charged in this step.

The hydrogenated effluent is removed from the hydrogenation zone via line 21 and conducted to suitable processing steps, not shown, for removal of the hydrogen and recovery of the product.

This invention has been described in respect to selective polymers of isobutylene but it is obvious that the process of this invention is applicable to other olefins, regardless of origin, which can be isomerized by a shift in the double bond to form a molecule with the same carbon skeleton but more resistant to losses by decomposition during hydrogenation.

*Example*

Isobutylene is polymerized over silica-alumina catalyst under mild conditions to yield a debutanized polymer consisting of a major proportion of 1-olefins. A portion of this polymer is hydrogenated over a catalyst of metallic nickel, metallic copper, and aluminum oxide at 550° F. The yield of debutanized hydrogenated polymer is only 75 volume per cent of the polymer charged.

A second portion of this polymer is isomerized over brucite at 250° F. and two liquid volumes per volume of catalyst per hour so the polymer contains only a small proportion of 1-olefins and a major proportion of 2-olefins. Upon hydrogenation under the same conditions as the first sample, the yield of debutanized hydrogenated polymer is 96 volume per cent of the polymer charged.

I claim:

1. In a process for the production of a paraffin hydrocarbon wherein a tertiary olefin in a hydrocarbon stream is selectively polymerized to form a dimer having a terminal carbon to carbon double bond and the dimer is subsequently hydrogenated to form the paraffin hydrocarbon, that improvement which comprises separation of said dimer from higher polymers and unpolymerized material by distillation, passing the resulting purified dimer over an isomerization catalyst comprising brucite at a temperature in the range from 50° to 450° F. and subsequently catalytically hydrogenating the resulting isomerized dimer to form the paraffin hydrocarbon.

2. A process for the production of 2,2,4-trimethylpentane which comprises selectively polymerizing isobutylene in a hydrocarbon stream containing the same, separating the resulting dimer from higher polymers and from unpolymerized material by distillation, passing the resulting purified dimer over an isomerization catalyst comprising brucite at a temperature in the range from 50° to 450° F., and catalytically hydrogenating the resulting isomerized dimer to form 2,2,4-trimethylpentane.

3. A process for the production of paraffins from 1-olefins which comprises passing a 1-olefin at a flow rate of from 0.5 to 5.0 liquid volumes per volume of catalyst per hour over an isomerization catalyst comprising brucite at a temperature between 50° and 450° F., isomerizing the 1-olefin to the corresponding 2-olefins, and subsequently hydrogenating the 2-olefins to the corresponding paraffin by passing the 2-olefins over a catalyst comprising metallic nickel, metallic copper and aluminum oxide at a temperature between 200° F. and 700° F., under pressure of from 750 to 1000 p. s. i. g. and in the presence of at least 10 mol per cent excess hydrogen.

4. A process for the production of 2,2,4-trimethylpentane which comprises passing 2,4,4-trimethylpentene-1 over a catalyst comprising brucite at a temperature between 50° and 450° F. and at a rate of flow equivalent to from 0.5 to 5.0 liquid volumes per volume of catalyst per hour, isomerizing the 2,4,4-trimethylpentene-1 to 2,4,4-trimethylpentene-2, and subsequently hydrogenating the 2,4,4-trimethylpentene-2 to 2,2,4-trimethylpentane by passing the 2,4,4-trimethylpentene-2 over a catalyst comprising metallic nickel, metallic copper and aluminum oxide at a temperature between 200° and 700° F. under pressure of from 750 to 1000 p. s. i. g. and in the presence of at least 10 mol per cent excess hydrogen.

HAROLD J. HEPP.

REFERENCES CITED

The following references are of record in the file of this patent:

UNITED STATES PATENTS

| Number | Name | Date |
|---|---|---|
| 2,353,552 | Drennan | July 11, 1944 |
| 2,357,741 | Howes et al. | Sept. 5, 1944 |
| 2,388,942 | Zimmerman | Nov. 13, 1945 |